(12) United States Patent
Yang et al.

(10) Patent No.: US 9,677,890 B2
(45) Date of Patent: Jun. 13, 2017

(54) POSITIONING AND MAPPING BASED ON VIRTUAL LANDMARKS

(71) Applicant: Intel Corporation, Santa Clara, CA (US)

(72) Inventors: Xue Yang, Arcadia, CA (US); Lei Yang, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 279 days.

(21) Appl. No.: 13/738,854

(22) Filed: Jan. 10, 2013

(65) Prior Publication Data

US 2014/0195149 A1    Jul. 10, 2014

(51) Int. Cl.
*G01C 21/20*   (2006.01)
*G01C 21/00*   (2006.01)
*G01S 5/02*    (2010.01)

(52) U.S. Cl.
CPC ......... *G01C 21/206* (2013.01); *G01C 21/005* (2013.01); *G01S 5/0252* (2013.01)

(58) Field of Classification Search
CPC .. G05D 1/0274; G05D 1/0231; G05D 1/0234; G05D 1/024; G05D 1/0242;
(Continued)

(56) References Cited

U.S. PATENT DOCUMENTS 8,359,044 B2 * 1/2013 MacNaughtan et al. .. 455/456.1
2006/0087425 A1 * 4/2006 Haeberlen et al. ...... 340/539.13
(Continued)

FOREIGN PATENT DOCUMENTS

CN    1488955      4/2004
CN    101509781    8/2009
(Continued)

OTHER PUBLICATIONS

International Search Report with Written Opinion received for PCT Patent Application No. PCT/US2014/010783 mailed on Apr. 28, 2014, 14 Pages.
(Continued)

*Primary Examiner* — Redhwan K Mawari
(74) *Attorney, Agent, or Firm* — Grossman, Tucker, Perreault & Pfleger, PLLC

(57) ABSTRACT

This disclosure is directed to positioning and mapping based on virtual landmarks. A space may include a plurality of signal sources (e.g., wireless access points (APs), cellular base stations, etc.). The space may be virtually divided into a plurality of regions, wherein each region in the space may be associated with a virtual landmark. Virtual landmarks may be identified by a signature comprised of measurements of wireless signals received from the plurality of access points when at the associated region. A device position may be approximated based on signal power magnitude and variance measurements for wireless signals received at the virtual landmark. Devices may employ an algorithm such as, for example, Simultaneous Localization and Mapping (SLAM) for positioning and map creation in the space without the need for GPS signals, specialized signaling equipment, pre-navigation device training, etc. Navigation/mapping may also account for space changes, signal source position changes, etc.

16 Claims, 8 Drawing Sheets

(58) Field of Classification Search
CPC .. G05D 1/0246; G05D 1/0248; G05D 1/0272; G05D 1/0278; G05D 2201/0207; G05D 2201/0215; Y10S 901/01; Y10S 901/47; Y10S 901/46
USPC ......... 701/23, 532, 24, 25, 26, 28, 301, 409, 701/445, 450, 461, 494, 495
See application file for complete search history.

(56) References Cited

U.S. PATENT DOCUMENTS

| | | | |
|---|---|---|---|
| 2008/0057873 | A1 | 3/2008 | Huang et al. |
| 2010/0045439 | A1 | 2/2010 | Tak et al. |
| 2010/0103048 | A1* | 4/2010 | Bamberger et al. ........... 342/451 |
| 2010/0280754 | A1* | 11/2010 | Goncalves et al. ........... 701/208 |
| 2011/0082585 | A1 | 4/2011 | Sofman et al. |
| 2012/0149415 | A1* | 6/2012 | Valaee et al. ................. 455/507 |
| 2012/0176491 | A1 | 7/2012 | Garin et al. |
| 2012/0184219 | A1 | 7/2012 | Richardson et al. |
| 2014/0195149 | A1* | 7/2014 | Yang et al. .................... 701/445 |
| 2014/0249771 | A1 | 9/2014 | Yang et al. |

FOREIGN PATENT DOCUMENTS

| | | |
|---|---|---|
| EP | 2538237 | 12/2012 |
| TW | 201116805 A | 5/2011 |
| TW | 201137313 A | 11/2011 |
| TW | 201212977 A | 4/2012 |
| WO | 2012106075 | 8/2012 |

OTHER PUBLICATIONS

Ferris, et al., "WiFi-Slam Using Gaussian Process Latent Variable Models", University of Washington, University of Sheffield.

Huang, et al., "Efficient, Generalized Indoor Wifi GraphSLAM", 2011 IEEE International Conference on Robotics and Automation, received Sep. 13, 2010.

Office Action from related TW Application 102148246, Mailed Feb. 4, 2015.

China Office Action from related application CN201480003431.1 mailed May 4, 2016.

Shin et al., "Wi-Fi Fingerpring-Based Topological Map Building for Indoor User Tracking", 2010 IEEE 16th International Conference on IEEE, Aug. 23, 2010.

European Search Report from related application EP14737847.5 mailed Jul. 28, 2016.

International Search Report with Written Opinion received for PCT Patent Application No. PCT/US2014/010783 mailed on Jul. 23, 2015.

Chinese Office Action issued in Chinese Application No. 201480003431.1, dated Jan. 3, 2017, with English translation, 26 pages.

* cited by examiner

POSITIONING AND MAPPING BASED ON VIRTUAL LANDMARKS

TECHNICAL FIELD

The present disclosure relates to positioning, and more particularly, to device positioning systems usable in instances wherein global positioning system (GPS) signals are not receivable.

BACKGROUND

As wireless technology continues to evolve, the variety of functionality available in new wireless devices continues to expand. Cellular handsets, smartphones, etc. have far surpassed the ability to simply convey voice information, and now offer a myriad of different applications for personal and professional use. For example, mobile devices may be able to access a WAN (e.g., the Internet) to obtain updated information for local applications, to interact with remote (e.g., cloud-based) data resources, to perform a variety of financial transactions, etc. The ability to perform all of these functions is quickly making mobile devices essential to modern living.

One area where mobile devices are becoming more and more essential is for navigation. For example, many mobile devices now include a global positioning system (GPS) receiver that facilitates position determination to within a few meters of the actual device location. Location-related applications rely on this information to perform locating with respect to maps, to perform navigation, to find desired locations including, for example, places to obtain desired items, event locations (e.g., for business meetings, dining, entertainment, etc.). However, relying on GPS signals substantially limits the usefulness of location-related applications to outdoor use. GPS signals are often not receivable indoors, and even if GPS signals are received they do not provide the degree of resolution needed for indoor navigation to be useful. Indoor navigation may be helpful in large structures such shopping malls, colleges, auditoriums, arenas, etc. For example, indoor positioning-related applications may be able to direct people to meeting rooms, customers to retail establishments that sell desired items, have items on sale, etc. Recently development has occurred in regard to navigation systems usable in spaces wherein GPS signals are not receivable or inaccurate. However, adoption of these systems has been hampered by various requirements, limitations, etc. For example, many proposed strategies for indoor navigation require additional equipment be installed in the space specifically for navigation, require device training prior to navigation, lack the ability to deal with changing conditions within the space to be navigated, etc.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
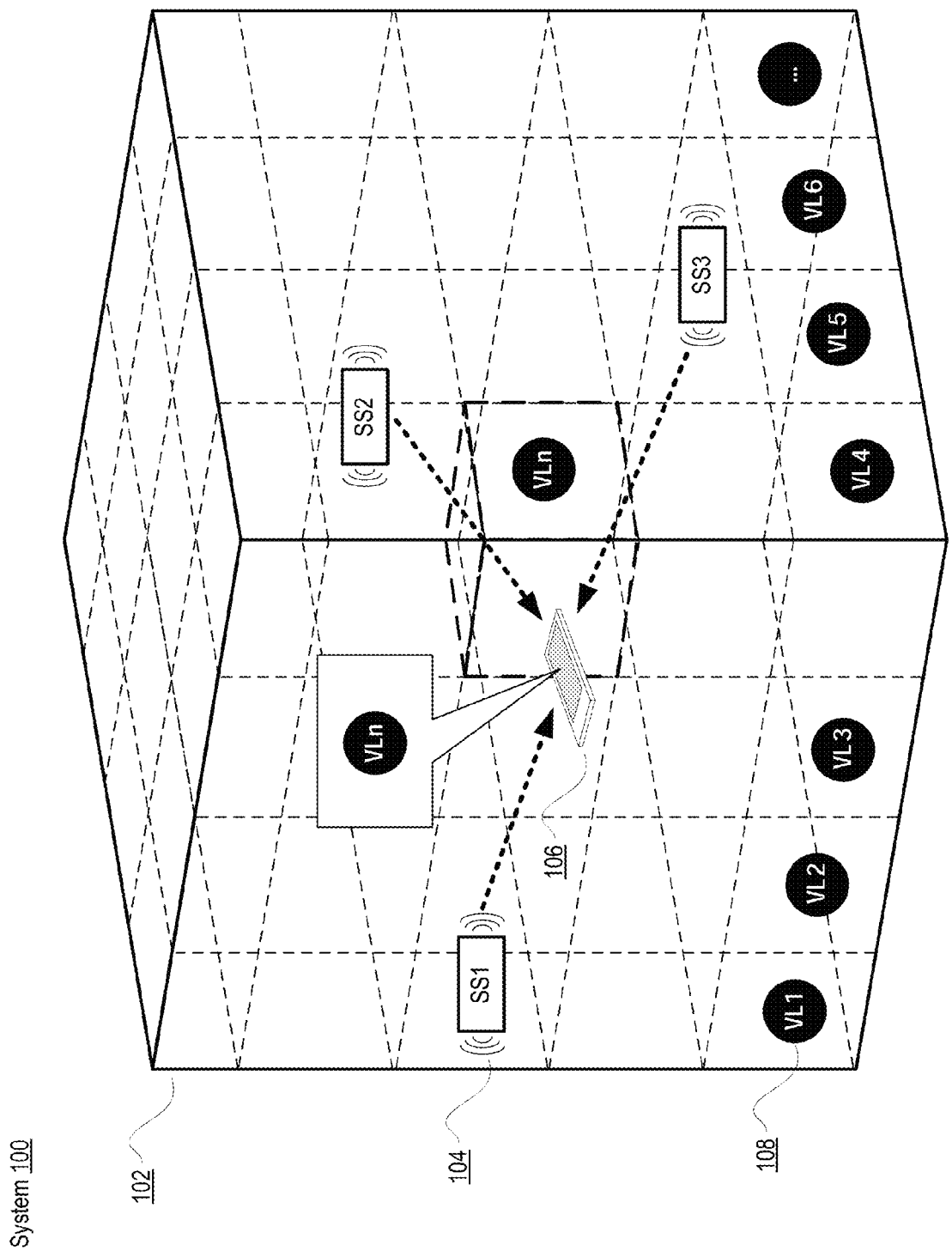
FIG. 1 illustrates an example of positioning and mapping based on virtual landmarks in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

This disclosure is directed to positioning and mapping based on virtual landmarks. In general, a space may include a plurality of signal sources such as, for example, wireless access points (APs), cellular base stations including smaller base stations such as femtocells, etc. The space may be virtually divided into a plurality of regions, wherein each region in the space may be associated with a virtual landmark. Virtual landmarks may be identified by a signature comprised of measurements of wireless signals received from the plurality of access points when in the region corresponding to the landmark. For example, a device position may be approximated based on signal power magnitude and variance measurements for wireless signals received at the virtual landmark. Devices may then employ an algorithm such as, for example, Simultaneous Localization and Mapping (SLAM) for positioning and map creation in the space without the need for GPS signals, specialized signaling equipment, pre-navigation device training, etc. Navigation/mapping may also account for space changes, signal source changes, etc.

In one embodiment, a device may include, for example, a communication module and a processing module. The communication module may be to at least receive wireless signals and the processing module may be to determine at least one virtual landmark in a space based on the received wireless signals, to generate a map for use in navigating the space based on the at least one virtual landmark and to navigate within the space based on the generated map. For example, the wireless signals may be short-range wireless communication signals from a plurality of signal sources in the space. Space may be virtually divided into a plurality of regions, each of the plurality of regions being associated with a virtual landmark. Virtual landmarks may be identified by, for example, a signature comprising measurements of signal power magnitude and variance in the wireless signals received from each of the plurality of signal sources. Power magnitude and variance of wireless signals may be based on, for example, received signal strength indication (RSSI).

In the same or a different embodiment, the processing module may generate the map and navigate within the space using a SLAM algorithm. For example, the SLAM algorithm may use the detection of virtual landmarks to uses detection of virtual landmarks to correct device pose estimations. In one embodiment, generating the map may comprise the processing module being to generate a provisional map based on the virtual landmarks, to determine whether the virtual landmarks were previously visited, and to update a permanent map to update the signature for at least one existing virtual landmark or to add at least one new virtual landmark based on the determination. Navigating within the space based on the map may comprise, for example, the processing module being further to update particle weights for the virtual landmarks based on the measured signatures for the virtual landmarks compared to the signatures recorded in the permanent or provisional maps. The processing module may be further to determine whether any radio signal sources at a new pose have changed position based on the updated particle weights being substantially similar. Determining whether any radio signal sources at the new pose have changed position may comprise, for example, the processing module being further to observe if signal power magnitude changes accumulated over all particles for any radio signal source is substantially higher than signal power magnitude changes accumulated over all particles for other radio signal sources. The processing module may then be further to remove from signatures of the virtual landmarks the signal measurements corresponding to any source of wireless signals whose position was determined to have changed. An example method for navigation and mapping consistent with at least one embodiment of the present disclosure may include determining that a device has changed position, estimating the position of the device within a space by determining virtual landmarks associated with regions within a plurality of regions into which the space is virtually divided, updating a map of the space in the device based on the determined virtual landmarks, and navigating within the space based on the map.

FIG. 1 illustrates an example of positioning and mapping based on virtual landmarks 108 in accordance with at least one embodiment of the present disclosure. System 100 may include, for example, space 102 comprising a plurality of signal sources (SS) 104 (e.g., SS1, SS2 and SS3) and device 106. Space 102 may be any location in which navigation and/or mapping assistance may be desirable but wherein GPS signals may not be received, may be inaccurate, etc., such as, for example, large structures including shopping malls, universities, hospitals, airports, large buildings, etc. Device 106 may be, for example, a mobile communication device such as a cellular handset or a smartphone based on the Android® operating system (OS), iOS®, Windows® OS, Blackberry® OS, Palm® OS, Symbian® OS, etc., a mobile computing device such as a tablet computer like an iPad®, Galaxy Tab®, Kindle Fire®, etc., an Ultrabook® including a low-power chipset manufactured by Intel Corporation, a netbook, a notebook, a laptop, a palmtop, etc. SS 104 may include any source of wireless signals, wherein aspects of the wireless signals may be measured and associated with the signal source. SS 104 may be, for example, wireless local area networking (WLAN) access points, or "WiFi APs," configured to provide a portal over which device 106 may be able to access larger networks like a WAN (e.g., the Internet), cellular base stations including smaller base stations such as femtocells, etc. It is important to note that while SS 104 may be employed in various embodiments consistent with the present disclosure, SS 104 may operate in space 102 with no relation to navigation (e.g., WiFi APs may function primarily as an Internet gateway, cellular base stations may function primarily to support wireless data/voice communication, etc.), while also serving a secondary role in a navigation system as will be explained further herein.

It may be desirable to employ electronic navigation in areas not accessible to satellite to, for example, locate fixed objectives (e.g., a first aid station, fire exit, retail establishment, etc.) or variable objectives (e.g., an updated departure gate for an airline flight, a changed meeting room, a retailer offering a limited time sale, a seat at an entertainment event, etc.). Existing navigation and/or mapping systems may require substantial amounts of input to generate position estimates. For example, robots may employ powerful sonar or laser-based ranging systems to approximate location. Alternatively, high precision navigation may be achieved in areas like space 102 via installing new navigation equipment external to the navigating device. These solutions may be inappropriate or unattractive to mobile device users because, for example, device 106 does not include interfaces necessary to support the new navigation equipment (e.g., an ultra-wide band (UWB) receiver), and moreover, the need to install a substantial amount of equipment in space 102 just for the purpose of positioning and/or mapping is prohibitive from a standpoint of complexity, cost, resource consumption, etc.

In one embodiment, space 102 may be "virtually divided" (e.g., not physically separate but divided for the purpose of mathematical calculation) into a plurality of regions (e.g., cells). For example, space 102 may be a building virtually divided into a 2 meter by 2 meter grid with each cell corresponding to a virtual landmark 108 (e.g., VL1, VL2, VL3, VL4, VL5, VL6 . . . ). The size of the regions may vary depending on, for example, the size of space 102, the location accuracy requirements of location-based services or applications using the navigation system, etc. At least benefit that may be realized in accordance with the various embodiments disclosed herein is that device 106 may self-construct a "location signature map" at the granularity of the cells without need for any pre-training efforts to label each signature with ground-truth location.

An example structure for a location signature map is illustrated in Table 1 below, where we denote the map by r. The signature map may comprise of a list of signatures for all regions (N) defined for space 102. For example, each signature may be denoted as $\Gamma_n$, and may comprise signature location $l_n$ (e.g., mapping to a virtual cell) and a signature location variance $V_n$. Each signature may also comprise K measurements, where each measurement may include the mean $q_{n,k}$ and variance $\partial_{n,k}$ of signal power corresponding to wireless signals received by device 106 (e.g., from SS1-SS3). For example, the signal power magnitude and variance may be based on Received Signal Strength Indication (RSSI). In the example of table 1, the measurements are associated with $n^{th}$ landmark and $k^{th}$ SS 104 (e.g. wherein K is the total number of SS 104).

TABLE 1

Example Location Signature Map

| Signature Position (x, y, z) (mean $l_n$, variance $V_n$) | Signature Measurements (e.g., RSSI mean $q_k$, variance $\partial_k$) for each SS 104 | | | |
|---|---|---|---|---|
| | SS1 | SS2 | . . . | SSk |

As shown in FIG. 1, device 106 may receive wireless signals from SS 104 (e.g., SS1-SS3) while within space 102, and may be able to identify at least one virtual landmark 108 (e.g., VLn) in proximity. The identification of proximate virtual landmarks 108 may be employed to both create a map of space 102 and to navigate within space 102. The map of space 102 may be created while navigating, even if the instance of navigation is the first time that device 106 is in space 102. Moreover, device 106 may be able to identify when features change in space 102, such as the locations of SS 104. Navigation and mapping of space 102 may be accomplished through the use of a navigation and mapping algorithm such as SLAM. It is important to note that while embodiments consistent with the present disclosure will be discussed in terms of the SLAM algorithm, these embodiments are not limited to implementation in this manner, and thus, may also be implemented using alternative methodologies for navigation and mapping.

Figure 2:
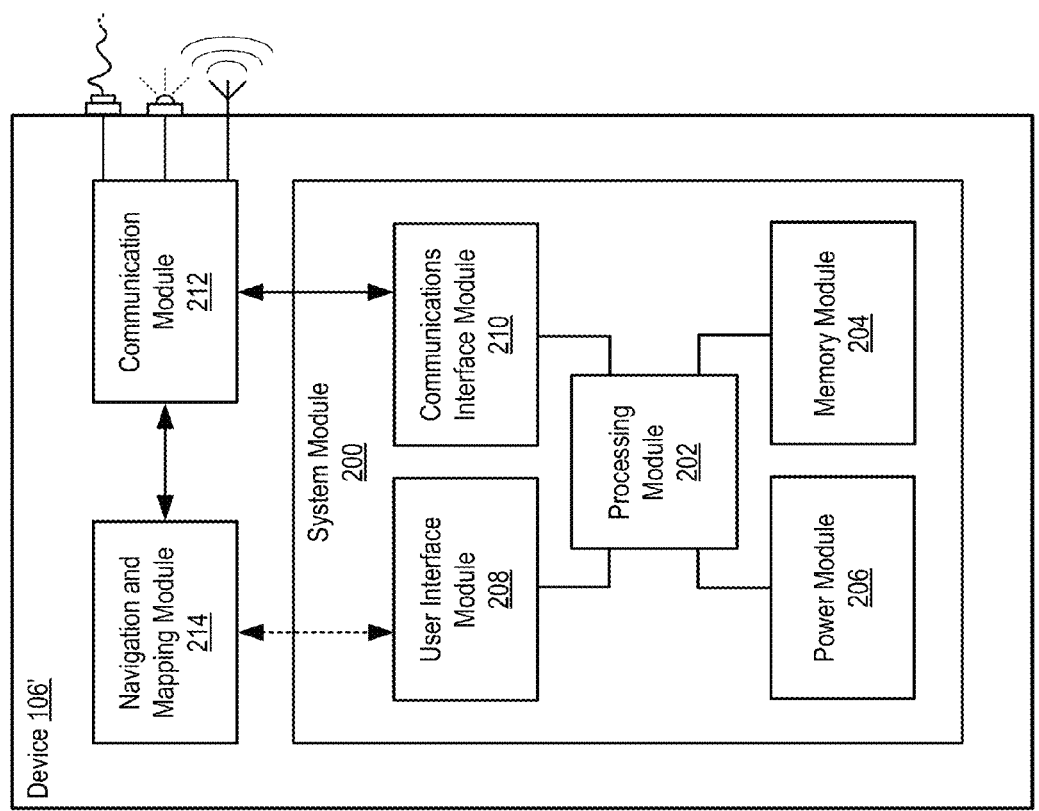
FIG. 2 illustrates an example configuration for a device usable in accordance with at least one embodiment of the present disclosure.

FIG. 2 illustrates an example configuration for device 106' usable in accordance with at least one embodiment of the present disclosure. In particular, device 106' may perform example functionality such as disclosed in FIG. 1. Device 106' is meant only as an example of equipment that may be used in accordance with embodiments consistent with the present disclosure, and is not meant to limit these various embodiments to any particular manner of implementation.

Device 106' may comprise system module 200 configured to manage device operations. System module 200 may include, for example, processing module 202, memory module 204, power module 206, user interface module 208 and communication interface module 210 that may be configured to interact with communication module 212. Device 106' may also include navigation and mapping module 214 configured to interact with at least user interface module 208 and communication module 212. While communication module 212 and navigation and mapping module 214 are shown separate from system module 200, this is merely for the sake of explanation herein. Some or all of the functionality associated with communication module 212 and/or navigation and mapping module 214 may also be incorporated within system module 200.

In device 106', processing module 202 may comprise one or more processors situated in separate components, or alternatively, may comprise one or more processing cores embodied in a single component (e.g., in a System-on-a-Chip (SOC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 106'. Some or all of the functionality commonly associated with the support circuitry may also be included in the same physical package as the processor (e.g., an SOC package like the Sandy Bridge integrated circuit available from the Intel Corporation).

Processing module 202 may be configured to execute various instructions in device 106'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) or read-only memory (ROM) in a fixed or removable format. RAM may include memory configured to hold information during the operation of device 106' such as, for example, static RAM (SRAM) or Dynamic RAM (DRAM). ROM may include memories such as bios memory configured to provide instructions when device 106' activates, programmable memories such as electronic programmable ROMs (EPROMS), Flash, etc. Other fixed and/or removable memory may include magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), etc. Power module 206 may include internal power sources (e.g., a battery) and/or external power sources (e.g., electromechanical or solar generator, power grid, fuel cell, etc.), and related circuitry configured to supply device 106' with the power needed to operate.

User interface module 208 may include circuitry configured to allow users to interact with device 106' such as, for example, various input mechanisms (e.g., microphones, switches, buttons, knobs, keyboards, speakers, touch-sensitive surfaces, one or more sensors configured to capture images and/or sense proximity, distance, motion, gestures, etc.) and output mechanisms (e.g., speakers, displays, lighted/flashing indicators, electromechanical components for vibration, motion, etc.). Communication interface module 210 may be configured to handle packet routing and other control functions for communication module 212, which may include resources configured to support wired and/or wireless communications. Wired communications may include serial and parallel wired mediums such as, for example, Ethernet, Universal Serial Bus (USB), Firewire, Digital Visual Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), optical character recognition (OCR), magnetic character sensing, etc.), short-range wireless mediums (e.g., Bluetooth, WLAN, Wi-Fi, etc.) and long range wireless mediums (e.g., cellular, satellite, etc.). In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission.

In the embodiment illustrated in FIG. 2, navigation and mapping module 214 may be configured to interact with communication module 212 and optionally with user interface module 208. For example, navigation and mapping module 214 may receive wireless signal information from communication module 212, may process the wireless signal information to generate a map and navigation, and may provide information to the user of the device in regard to the mapping and navigation using user interface module 208. For example, navigation and mapping module 208 may cause a current location for device 106' to appear on a display in device 106', may cause a map of space 102 to appear on the display in device 106', may display and/or audibly play multimedia information directing the user of device 106' towards a target objective, etc. In another embodiment, the device user may not aware of current device location, but location information may still be used to trigger various events in device 106'. For example, location information derived from navigation and mapping consistent with the present disclosure may be fed to various location-based applications executing in device 106' (e.g., location-based advertisements) instead of to user interface module 208. While illustrated as separate module 214 comprising hardware and/or software, it may also be possible for some or all of navigation and mapping module 214 to be embodied in software (e.g., as instructions and/or data stored in memory module 204 and executed by processing module 202).

Figure 3:
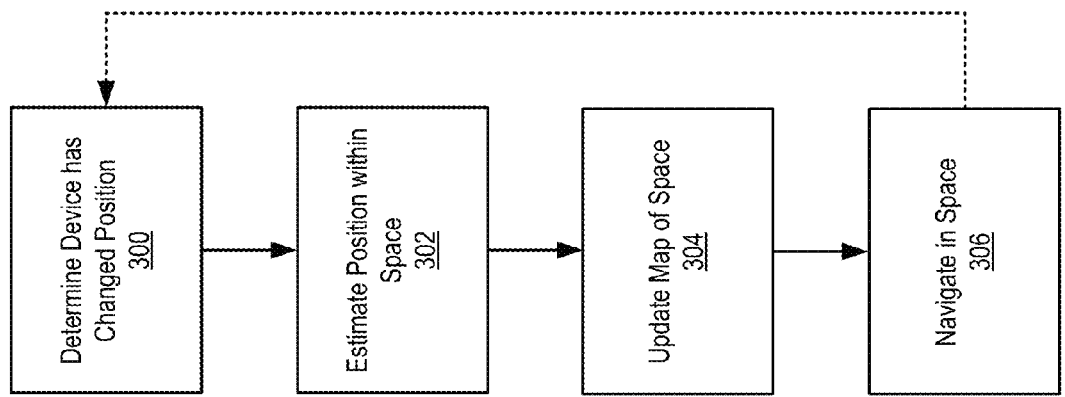
FIG. 3 illustrates example operations for positioning and mapping based on virtual landmarks in accordance with at least one embodiment of the present disclosure.

FIG. 3 illustrates example operations for positioning and mapping based on virtual landmarks 108 in accordance with at least one embodiment of the present disclosure. The example operations shown in FIG. 3 describe a general navigation and mapping algorithm usable in accordance with various embodiments, with more specific example operations associated with each of example operations 300-306 being described further in FIG. 4-8. In operation 300 it may be determined that device 106 has changed position. Position change determination in operation 300 may be followed by device 106 estimating its new position within space 102. Following a determination of an estimated position in operation 302, device 106 may update a map of space 102 in operation 304. The update of the map for space 102 in operation 304 may be followed by navigating within space 102 in operation 306. Operation 306 may optionally be followed by a return to operation 300 in preparation to determine the next position change for device 106 (e.g., example operations 300-306 may be repeated each time new wireless signals are received from one or more SS 104, every time a movement is detected with respect to device 106, etc.).

Figure 4:
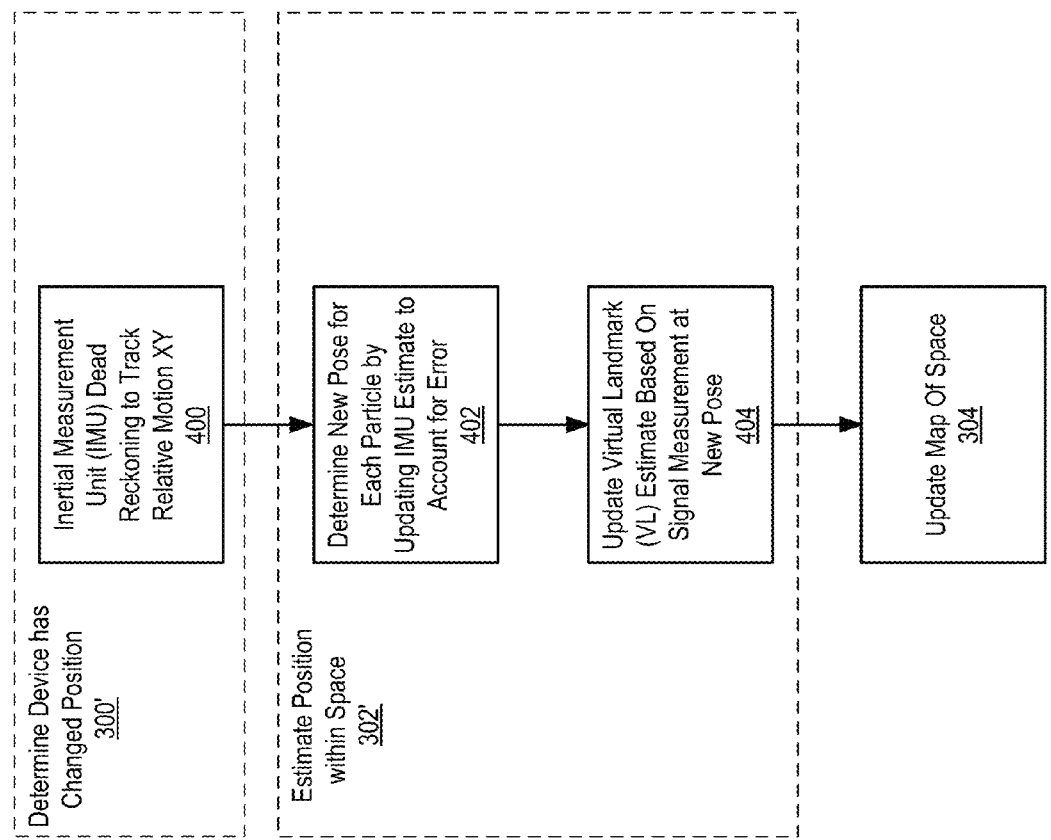
FIG. 4 illustrates example operations for determining a device has changed position and for estimating position within a space in accordance with at least one embodiment of the present disclosure.

FIG. 4 illustrates example operations for determining a device has changed position and for estimating position within a space in accordance with at least one embodiment of the present disclosure. In operation 400 an internal measurement unit (IMU) internal to device 106 may be employed to track the relative motion XY of device 106 via dead reckoning. For example, the pose (e.g., position and/or orientation) of device 106 may be defined as $S_t$, where t is a discrete time index, and $S_t$ comprises of x, y, z coordinates along with the angular orientation of device 106 at time t. The example sequence $s^t = s_1, s_2, \ldots s_t$ may denote the path of device 102 up to time t. Signal measurements at time are represented by z, and I represents inertial sensor measurements at time t. Consistent with at least one embodiment of the present disclosure, a posterior of device 106 may be calculated over the motion path $s^t = s_1, s_2, \ldots s_t$ and the location signature map $p(s^t, \Gamma | z_{1:t}, I_{1:t})$ given the radio and inertial sensor measurements up to time t.

In operation 402, a new pose for each particle may be determined by updating the IMU estimate to account for error. For example, in terms of the SLAM algorithm the posterior may be calculated over the possible paths taken by device 106 using a particle filter, and the conditional posteriors over virtual landmark locations may be calculated by extended Kalman filters (EKF), where each EKF estimates a single virtual landmark location. The individual EKFs may be conditioned on the possible paths of device 106, and each particle may possess its own set of EKFs to update landmarks' locations. These operations may be performed for each particle and may be repeated M times, resulting in a temporary set of M particles. Extending the path posterior by sampling new poses based on motion model, given current mobile device pose and measurements inputs. That is $$s_t^{[m]} \sim p(s_{t-1}^{[m]}, I_t, z_t) \quad (1)$$

wherein $s_t^{[m]}$ represents the pose of device 106 estimated by the $m^{th}$ particle at time t. Observed virtual landmark signatures may be associated with virtual landmark 104 $n=n_t$ based on, for example, map information. At least one possible way in which to facilitate matching is to choose $n_t$ to maximize the likelihood of the sensor measurement $z_t$. In addition, a new virtual landmark may be added when the likelihood of the signature corresponding to an existing virtual landmark falls below a certain threshold. In instances where SLAM is employed, the correspondence between landmark and signatures may be estimated on a per-particle basis, and each particle may carry its own virtual landmark count, denoted as $N_t^{[m]}$ where [m] stands for the $m^{th}$ particle.

In operation 404, virtual landmark (VL) estimates may be updated based on signal (e.g., WiFi) measurement. This operation may involve updating the posterior location approximations over the virtual landmark estimates. The update depends on whether or not a virtual landmark n was observed at time t. If a virtual landmark was not observed, the posterior over the virtual landmark remains unchanged, that is:

$$<l_{n,t}^{[m]}, v_{n,t}^{[m]}> = <l_{n,t-1}^{[m]}, v_{n,t-1}^{[m]}> \quad (2)$$

For the observed landmark $n=n_t$ the update may be specified through the following equation:

$$p(\Gamma_{n_t}, s^t, n^t, z^t) = \eta p(z_t | s_t, \Gamma_{n_t}, n^t) p(\Gamma_{n_t}, s^{t-1}, n^{t-1}, z^{n-1}) \quad (3)$$

Wherein $\eta$ is a normalizing factor, the probability $p(\Gamma_{n_t}, s^{t-1}, n^{t-1}, z^{t-1})$ at time t-1 may be represented by a Gaussian function with mean $l_{n_t,t-1}^{[m]}$ and variance $v_{n_t,t-1}^{[m]}$. The probability $p(z_t | s_t, \Gamma_{n_t}, n^t)$ may be governed by the measurement function:

$$p(z_t | s_t, \Gamma_{n_t}, n^t) = g(s_t, \delta_{n_t}) + \epsilon_t \quad (4)$$

The measurement function may be conditioned on the pose $S_t$ of device 106, virtual landmark $n_t$ and the specific landmark feature $\Gamma_{n_t}$ that is being observed. However, in one embodiment this solution must be tailored to an environment wherein device 106 navigates in space 102 primarily using virtual landmarks 108. A signal (e.g., WiFi) measurement model may also be needed that specifies how he WiFi measurement $z_t$, is related to equation (4) wherein g is a deterministic function, $\epsilon_t$ models random noise at time t that is assumed to be normally distributed with mean zero and covariance $R_t$. In this regard a relationship may be defined as follows:

$$g(s_t, \Gamma_{n_t}) = q_{n_t,t-1} + H^*(l_{n_t,t} - l_{n_t,t-1}) \quad (5)$$

Wherein:

$$h = \exp\left(-\frac{1}{2\tau^2} \|s_t - l_{n_t}\|^2\right); \quad (6)$$

and $$H = h'(n_t, l_{n_t}) \quad (7)$$

That is, H is the derivative of h taken with respect to the landmark $n_t$ and coordinate $l_{n_t}$. As opposed to prior mapping/navigation systems employing Gaussian Processes, in the above relationship a WiFi measurement model may be captured in relevance to one particular landmark. The observation may be made that, given mobile device position $S_t$, a different virtual landmark estimate may be conditionally independent. Therefore, given $S_t$ and $\Gamma_{n_t}$, signal prediction can be written as the function of WiFi signal mean $q_{n_t,t-1}$ at landmark $n_t$, and the landmark location $l_{n_t}$ as shown in Eq. (5).

Based on Eq. (3), the landmark location $l_{n_t}$ and variance $V_{n_t}$ may be updated according to the difference between current signal measurement (e.g., RSSI) $Z_t$ and landmark $n_t$ WiFi mean RSSI $q_{n_t,t-1}$. The update procedure may follow an EKF update. Additionally, the signal fingerprint mean and variance need to be updated. Given past observations associated with virtual landmark $n_t$ $z_{n_t,1}$, $z_{n_t,2}$, $z_{n_t,3}$, ... $z_{n_t,j}$ WiFi fingerprint Gaussian mean $q_{n_t}$ and variance $\partial_{n_t}$ associated with landmark $n_t$ may be updated. Given $f(z_{n_t}|q_{n_t}) \sim N(q_{n_t}, \sigma)$ where $\sigma$ is the variance of zero measurement noise, the introduction of Bayes estimation may result in:

$$q_{n_t} = \frac{1}{j}\sum_{i=1}^{j} z_{n_t,i} \tag{8}$$

$$\partial_{n_t} = \frac{1}{j}\sum_{i=1}^{j} (z_{n_t,i} - q_{n_t})^2 - \sigma \tag{9}$$

For each particle generated in the above operations, an importance factor $\omega_t^{[m]}$ may be calculated to reflect the probability of measurement. All particles along with their importance factor may then be collected in a temporary particle set. In instances wherein SLAM is employed, resampling may then commence, drawing M particles from the temporary particle set. Each particle may be drawn with a probability proportional to its importance factor $\omega_t^{[m]}$. The resulting particle set asymptotically represents the desired posterior at time t. The resampling process essentially accounts for the difference of the target and the proposal distribution.

Figure 5:
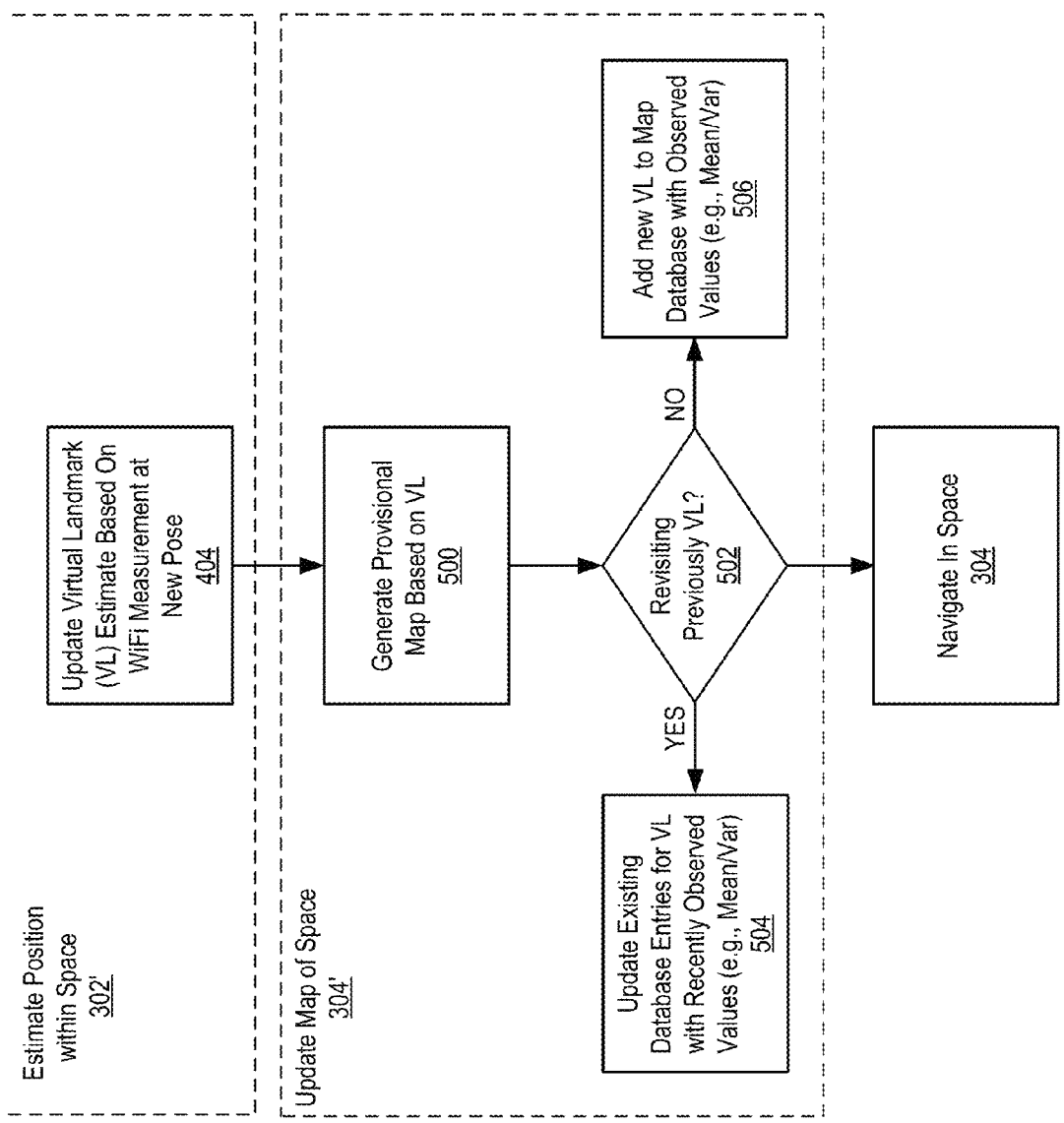
FIG. 5 illustrates example operations for updating a map of the space in accordance with at least one embodiment of the present disclosure.

FIG. 5 illustrates example operations for updating a map of the space in accordance with at least one embodiment of the present disclosure. Existing solutions propose implementations of SLAM requiring pre-training (e.g., calculate location signature map offline using unlabeled training data). In embodiments consistent with the present disclosure, an important objective is to completely remove training process and rely only on data collected during routine activities to calculate location signature map and estimate mobile device pose. As a result, the process by which the location signature map grows from being empty to fully-populated becomes important.

Generating a location signature map from scratch is a SLAM problem with unknown data associations. Initially, the map will start with zero virtual landmarks 108. When a new virtual landmark n is being observed and added, $\Gamma_n$ will be initialized (e.g., including location mean $l_n$, variance $V_n$, signal mean $q_{n,k}$ and variance $\partial_{n,k}$) and the weight of the particle will be initialized as $\omega_t^{[m]}=p_0$. One outcome of this approach may be that two particles into the unknown space are not discriminated from each other (e.g., given the equal weight). In other words, unless existing virtual landmark 108 in the map is observed, the posterior remains only governed by the motion model. As described with respect to operation 400 in FIG. 4, INS may be used to derive mobile device motion. It is established that location estimation uncertainty from INS alone will grow in time unbounded.

In one embodiment, Gaussian Process prediction may be employed to improve the performance in the initial process. In particular, let $\Gamma_t=\{\Gamma_1, \Gamma_2, \ldots, \Gamma_n\}$ be the signal fingerprint map at time t with n landmarks. We create a provisional map $D_t$ based on $\Gamma_t$ in operation 500.

$$D_t=\{\Gamma_1,\Gamma_2\ldots,\Gamma_n,\Gamma_{n+1},\Gamma_{n+2},\Gamma_N\} \tag{10}$$

Where $\Gamma_1, \Gamma_2\ldots, \Gamma_n$ is the same as that in $\Gamma_t$ and $\Gamma_{n+1}, \Gamma_{n+2}, \Gamma_N$ are predicted for rest of unobserved virtual cells using Gaussian Process. More specifically, given an unobserved virtual cell i and its corresponding location POSi, we will calculate $$q_i = k_i^T(K+\sigma I)^{-1}y \tag{11}$$

$$\delta_i = k(pos_i, pos_i) - k_i^T + (K+\sigma I)^{-1}k_i \tag{12}$$

Here $k_i$ is the n×1 covariance vector between $pos_i$ and the n known landmarks in $\Gamma_t$, y is the WiFi signal mean of the n known landmarks in $\Gamma_t$ and K is the covariance matrix among n known landmark in $\Gamma_t$. Both $k_i$ and K can be calculated from Gaussian Process kernel function. In general, the uncertainty of the predicted WiFi signal is related to n, the number of known virtual landmarks 108, and the distance between POSi and known virtual landmarks 108. Based on $q_i$ and $\delta_i$ the likelihood of observing a measurement at virtual cell I may be calculated.

In operation 500 a provisional map may be generated based on the observation of virtual landmark 108. A determination may then be made in operation 502 as to whether virtual landmark 108 is recognized (e.g., whether device 106 has visited virtual landmark 108 before). The identity of virtual landmark 108 (e.g., with which the signal measurements are associated) may be determined based on the pose estimate for the $m^{th}$ particle $S_t^{[m]}$ in device 106. Whenever obtaining a new signal measurement that is not an already observed landmark in fingerprint map $\Gamma_t$, a switch may be made to provisional map $D_t$. Thus, if it is determined in operation 500 that virtual landmark 108 has been visited before, then in operation 504 signal measurements associated with virtual landmark 108 may be added to the fingerprint map $\Gamma_t$ (e.g., to update the signature with the most recently observed measurements). Otherwise, in operation 506 a new entry may be added to the fingerprint map (e.g., device 106 may add observed landmark 108 into the WiFi fingerprint map $\Gamma_t$, along with updating the landmark location and observed signal).

Figure 6:
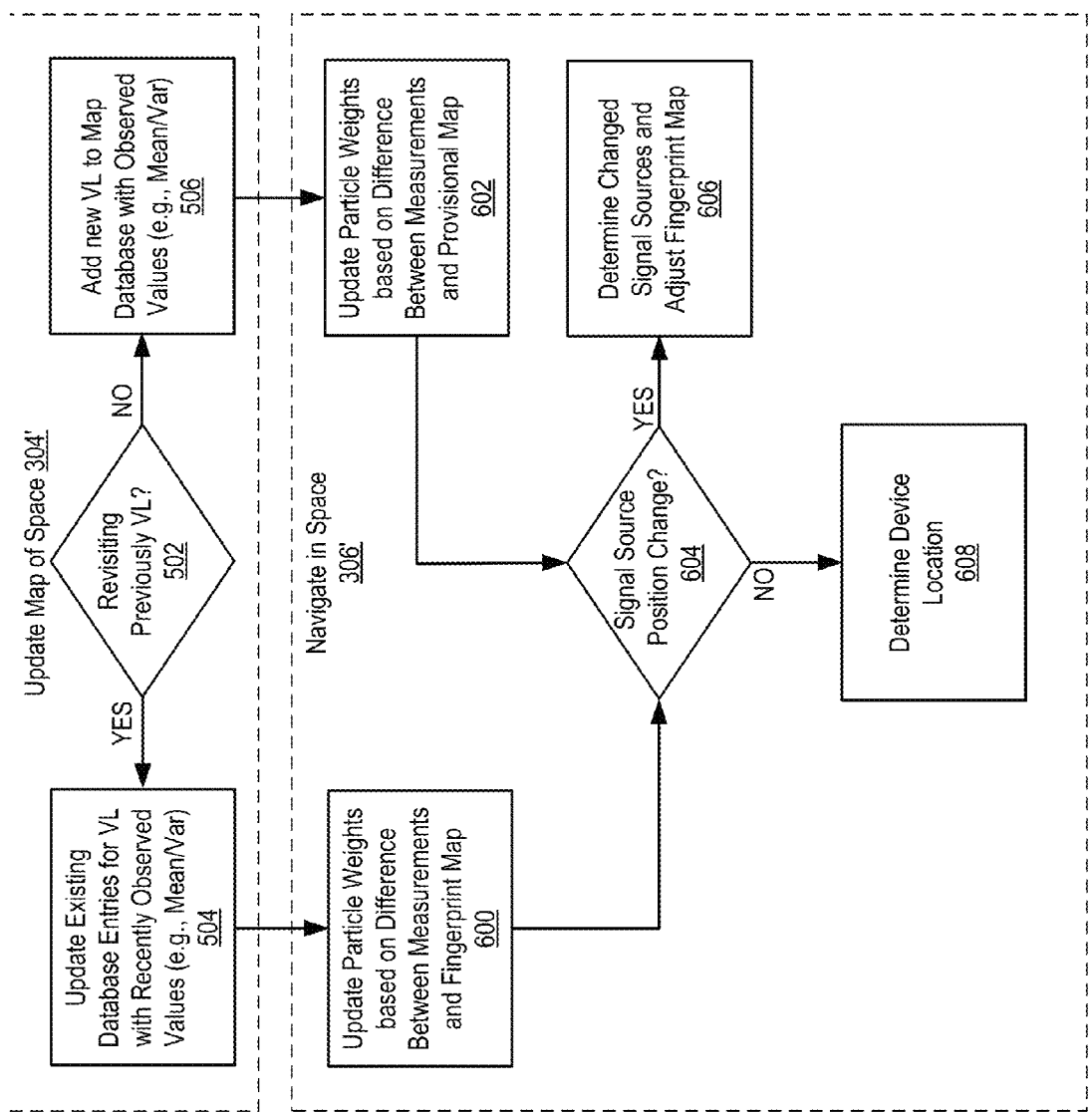
FIG. 6 illustrates example operations for navigating within the space in accordance with at least one embodiment of the present disclosure.

FIG. 6 illustrates example operations for navigating within the space in accordance with at least one embodiment of the present disclosure. In operations 600 and 602 particle weights based on the different between measurements and the fingerprint map $\Gamma_t$ or provisional map $D_t$, respectively, are updated. For example, an importance factor $\omega_t^{[m]}$ may be generated to reflect the probability of measurements based on $q_i$ and $\delta_i$ in provisional map $D_t$ for this particular particle. Provisional map $D_t$ may be updated based on the update signal fingerprint map $\Gamma_t$ at each time. The benefit of using provisional map is that the estimation error for device location and landmark locations is constrained by both the INS error and the WiFi prediction error, instead of being constrained by INS error alone. At the beginning time, the INS error is small and particles are condensed, which contributes to small estimation error. As time grows, the INS error gets larger and the particles are more diverse. At that time, the WiFi prediction will plays a key role in picking a better particle to reflect the target posterior.

Following operations 600 or 602, a determination may then be made in operation 604 as to whether the position of any SS 104 has changed based on received signals. If in operation 604 it is determined that the position of any SS 104 has changed, then in operation 606 any particular SS 104 whose position has changed may be determined, and the fingerprint map may be adjusted accordingly. Otherwise, in operation 608 the current location of device 106 may be determined.

Figure 7:
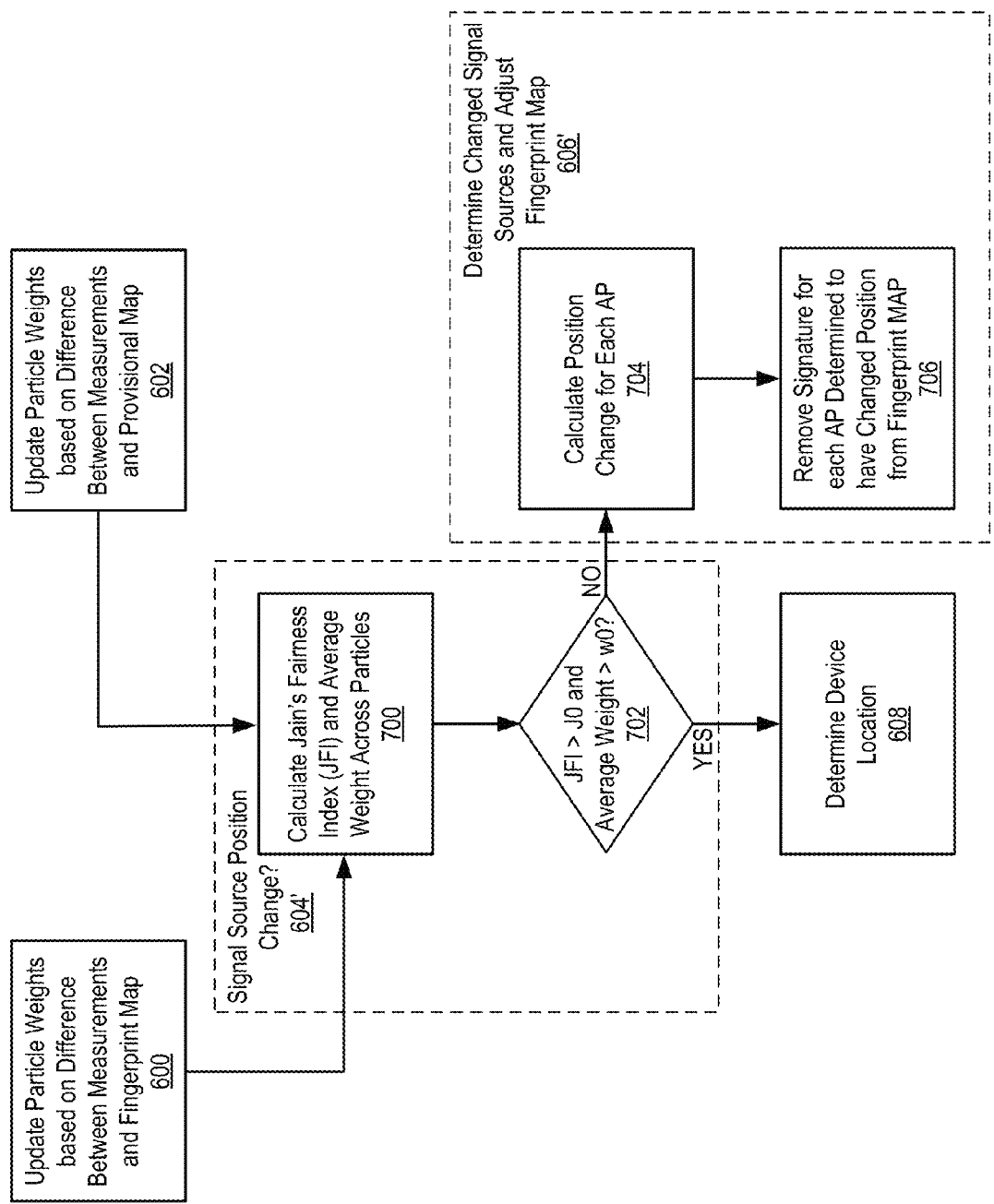
FIG. 7 illustrates example operations for determining if any signal source has changed position and updating maps based on signal sources that were determined to have changed position in accordance with at least one embodiment of the present disclosure.

FIG. 7 illustrates example operations for determining if any SS 104 has changed position and updating maps based on any SS 104 determined to have changed position in accordance with at least one embodiment of the present disclosure. Traditional SLAM solutions solve the problem of generating a map in a fixed environment. However, it is possible that the radio environment can change when an SS 104 is moved, when transmission power of an SS 104 is changed, etc. Therefore, another problem not addressed by traditional SLAM is how to detect changes in the environment of space 102.

Changing SS 104 may be identified by comparing the signal of each SS 104 with prior observations and/or other SS 104. Since changing SS 104 may affect the importance factor update and reduce location estimation accuracy, the existing signal map estimate $\Gamma_{n,k}$ for SS 104 may be removed from consideration to eliminate such negative impact and to allow the mapping algorithm (e.g., SLAM) to re-learn the new estimate based on the new location of SS 104. A first approach is to compare the current observed signal fingerprint map with the previously maintained fingerprint map. More specifically, in addition to the output fingerprint map F, a temporary fingerprint map generated every Tw time (e.g., Tw=10 minutes). The difference in the consecutive temporary fingerprint maps for each SSk 104 at every Tw time may then be examined:

$$\Delta_k = \Gamma_{n_{t,k}} - \Gamma_{n_{t-Tw,k}} \quad (13)$$

If the difference $\Delta_k$ exceeds a threshold $T_\Delta$, SSk 104 is determined to have changed its power or location. The signature $\Gamma_{n,k}$ associated with SSk in fingerprint map $\Gamma$ may then be invalidated. While the signature about the changing SSk will be re-learned from scratch, the signatures of other unchanged SSk will continue to be used for SLAM localization and mapping. Our first approach has long delay in detecting the changing SS 104 (i.e., Tw) via using history information.

An alternate embodiment consistent with the present disclosure does not need a prior signal map history, but only uses the current observations by checking the particle importance factors across different SS 104. This approach allows the instantaneous detection of changing SS 104. In principle, the above importance factor (e.g., operations 600 and 602 in FIG. 6) may determine the weight of each particle so that the resulting particle set approximates the target distribution. The importance factor is essentially determined by the likelihood of measurement given the pose of device 106 St and the landmark identity $n_t$. When the importance factor of a particle is low, it means the likelihood of having the measurement $Z_t$ is low, which may result due to, for example, an inaccurate pose estimate for device 106 or an SS 104 has changed. An incorrect pose estimate will only affect the particular particle, but a changed SS 104 will affect all particles. The changing radio environment may therefore be deduced through the distribution of importance factor. In FIG. 7, operations 700 and 702 may correspond to determining whether any SS 104 has changed position (e.g., operation 604'), while operations 704 and 706 may correspond to determining the changed SS 104 and adjusting the fingerprint map accordingly (e.g., operation 606'). In operation 700, $\Omega$ may be the set of importance factor for all particles, and Jain's fairness index J and the average of weight $\overline{\omega}$ may be calculated across the set $\Omega$, wherein:

$$J = \frac{\left(\sum_{i=1}^{M} \omega_i\right)^2}{M \sum_{i=1}^{M} \omega_i^2} \quad (14)$$

If in operation 702 it is determined that J is higher than a threshold $J_o$ and $\overline{\omega}$ is higher than a threshold $\omega_0$, then the indication is that the radio environment has not changed in operation 804. Alternatively if it is determined in operation 702 that J is lower than or equal to the threshold $J_o$ or $\overline{\omega}$ is lower than a threshold $\omega_0$ then the location of at least one SS 104 in space 102 has changed. In operation 704 any SS 104 that has changed location may be identified. In this regard, a signal measurement from each SSk 104 across all particles may be calculated:

$$\gamma_k = \sqrt{\frac{1}{M} \sum_{i=1}^{M} (q_{n_t}^{[i]} - z_t)^2} \quad (15)$$

The intuition is that if the measurement difference is caused by a change in location for SS 104, the $\gamma_k$ corresponding to any SSk 104 that has changed will have significant larger value than other unchanged SS 104. On the other hand, if the measurement difference is caused by pose estimation error, then $\gamma$ corresponding to multiple SS 104 will have large values. Therefore, the mean $\overline{\gamma}$ across all SS 104 may be calculated along with the ratio $\gamma k/\overline{\gamma}$. If the ratio of an SS 104 is larger than a threshold $\gamma_0$ it is understood that the SS 104 has changed, and in operation 706 the mean $q_{n,k}$ and variance $\partial_{n,k}$ may be invalidated (e.g., removed from consideration) in fingerprint map $\Gamma_t$ associated with any SS 104 that was determined to have changed position. While the signature about the changing SS 104 may be relearned from scratch, the signatures of other unchanged SS 104 will continue to be used for SLAM localization and mapping.

Figure 8:
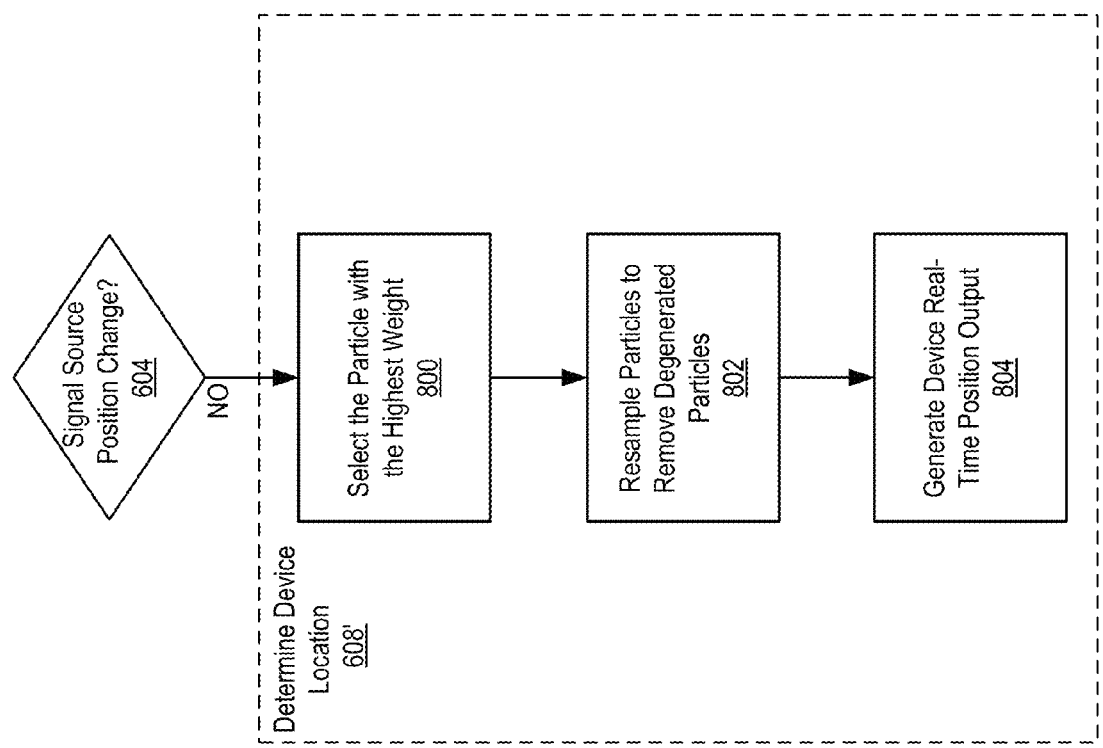
FIG. 8 illustrates example operations for determining device location in accordance with at least one embodiment of the present disclosure.

FIG. 8 illustrates example operations for determining device location in accordance with at least one embodiment of the present disclosure. In operation 800, the particle having the highest weight, and thus the highest probability of being correct, may be selected. Other particles may then be resampled in operation 802 to remove degenerated particles from consideration. A device real-time position output may then be generated in operation 804 based on, for example, the remaining particles. In one embodiment, the real-time device position may be presented to the user of device 106 in a variety of manners including, for example, as a location with respect to a map, as a coordinate position, etc. The real-time device position may also be used for other direction-related operations including, for example, directing the user of device 106 to a particular location, determining locations of interest around the user, etc.

While FIGS. 3 to 8 illustrate operations according to various embodiments, it is to be understood that not all of the operations depicted in FIGS. 3 to 8 are necessary for other embodiments. Indeed, it is fully contemplated herein that in other embodiments of the present disclosure, the operations depicted in FIGS. 3 to 8, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, this disclosure is directed to positioning and mapping based on virtual landmarks. A space may include a plurality of signal sources (e.g., wireless access points (APs), cellular base stations, etc.). The space may be virtually divided into a plurality of regions, wherein each region in the space may be associated with a virtual landmark. Virtual landmarks may be identified by a signature comprised of measurements of wireless signals received from the plurality of access points when at the associated region. A device position may be approximated based on signal power magnitude and variance measurements for wireless signals received at the virtual landmark. Devices may employ an algorithm such as, for example, Simultaneous Localization and Mapping (SLAM) for positioning and map creation in the space without the need for GPS signals, specialized signaling equipment, pre-navigation device training, etc. Navigation/mapping may also account for space changes, signal source position changes, etc.

The following examples pertain to further embodiments. In one example there is provided a device. The device may include a communication module to at least receive wireless signals, and a processing module to determine at least one virtual landmark in a space based on the received wireless signals, to generate a map for use in navigating the space based on the at least one virtual landmark, and to navigate within the space based on the generated map.

The above example device may be further configured, wherein the communication module is to receive short-range wireless communication signals from a plurality of radio signal sources within the space. In this configuration the example device may be further configured, wherein the space is virtually divided into a plurality of regions, each of the plurality of the regions being associated with a virtual landmark. In this configuration the example device may be further configured, wherein each virtual landmark associated with a region in the space is identified by a signature comprising measurements of signal power magnitude and variance in the wireless signals received from each of the plurality of signal sources within the space. In this configuration the example device may be further configured, wherein the measured power magnitude and variance of the wireless signals is based on Received Signal Strength Indication (RSSI).

The above example device may be further configured, alone or in combination with the above further configurations, wherein the processing module is to generate the map and navigate using a Simultaneous Localization and Mapping (SLAM) algorithm. In this configuration the example device may be further configured, wherein the SLAM algorithm uses detection of virtual landmarks to correct device pose estimations. In this configuration the example device may be further configured, wherein generating the map comprises the processing module being to generate a provisional map based on the virtual landmarks, to determine whether the virtual landmarks were previously visited, and to update a permanent map to update the signature for at least one existing virtual landmark or to add at least one new virtual landmark based on the determination. In this configuration the example device may be further configured, wherein navigating within the space based on the map comprises the processing module being further to update particle weights for the virtual landmarks based on the measured signatures for the virtual landmarks compared to the signatures recorded in the permanent or provisional maps. In this configuration the example device may be further configured, wherein the processing module is further to determine whether any radio signal sources at a new pose have changed position based on the updated particle weights being substantially similar. In this configuration the example device may be further configured, wherein determining whether any radio signal sources at the new pose have changed position comprises the processing module being further to observe if signal power magnitude changes accumulated over all particles for any radio signal source is substantially higher than signal power magnitude changes accumulated over all particles for other radio signal sources. In this configuration the example device may be further configured, wherein the processing module is further to remove from signatures of the virtual landmarks the signal measurements corresponding to any source of wireless signals whose position was determined to have changed.

In another example there is provided a method. The method may include determining that a device has changed position, estimating the position of the device within a space by determining virtual landmarks associated with regions within a plurality of regions into which the space is virtually divided, updating a map of the space in the device based on the determined virtual landmarks, and navigating within the space based on the map.

The above example method may be further configured, wherein determining the device has changed position comprises sensing a position change in the device based on inertial sensors within the device.

The above example method may be further configured, alone or in combination with the above example configurations, wherein estimating the position of the device comprises determining a new pose for particles corresponding to possible positions of the device within the space in accordance with a Simultaneous Localization and Mapping (SLAM) algorithm. In this configuration the example method may further comprise updating virtual landmark estimates based on signal power magnitude and variance measurements of wireless signals received at the new pose, the wireless signal measurements forming a signature by which virtual landmarks are identified. In this configuration the example method may be further configured, wherein updating the map comprises generating a provisional map based on the virtual landmarks, determining whether the virtual landmarks were previously visited, and updating a permanent map to update the signature for at least one existing virtual landmark or to add at least one new virtual landmark based on the determination. In this configuration the example method may be further configured, wherein navigating within the space based on the map comprises updating particle weights for the virtual landmarks based on the measured signatures for the virtual landmarks compared to the signatures recorded in the permanent or provisional maps. In this configuration the example method may further comprise determining whether any radio signal sources at the new pose have changed position based on the updated particle weights being substantially similar. In this configuration the example method may be further configured, wherein determining whether any radio signal sources at the new pose have changed position comprises observing if signal power magnitude changes accumulated over all particles for any radio signal source is substantially higher than signal power magnitude changes accumulated over all particles for other radio signal sources. In this configuration the example method may further comprise removing from the signatures of the virtual landmarks the signal measurements corresponding to any source of wireless signals whose position was determined to have changed.

In another example there is provided a system comprising at least a device, the system being arranged to perform the method of any of the above example methods.

In another example there is provided a chipset arranged to perform any of the above example methods.

In another example there is provided at least one machine readable medium comprising a plurality of instructions that, in response to be being executed on a computing device, cause the computing device to carry out any of the above example methods.

In another example there is provided a device configured for positioning and mapping based on virtual landmarks arranged to perform any of the above example methods.

In another example there is provided a device having means to perform any of the above example methods.

In another example there is provided at least one machine-readable storage medium having stored thereon individually or in combination, instructions that when executed by one or more processors result in the system carrying out any of the above example methods.

In another example there is provided a device. The device may include a communication module to at least receive wireless signals, and a processing module to determine at least one virtual landmark in a space based on the received wireless signals, to generate a map for use in navigating the space based on the at least one virtual landmark, and to navigate within the space based on the generated map.

The above example device may be further configured, wherein the communication module is to receive short-range wireless communication signals from a plurality of radio signal sources within the space, which is virtually divided into a plurality of regions each associated with a virtual landmark, each virtual landmark associated with a region in the space being identified by a signature comprising measurements of signal power magnitude and variance in the wireless signals received from each of the plurality of signal sources within the space.

The above example device may be further configured, alone or in combination with the above further configurations, wherein the processing module is to generate the map and navigate using a Simultaneous Localization and Mapping (SLAM) algorithm that uses detection of virtual landmarks to correct device pose estimations. In this configuration the example device may be further configured, wherein generating the map comprises the processing module being to generate a provisional map based on the virtual landmarks, to determine whether the virtual landmarks were previously visited, and to update a permanent map to update the signature for at least one existing virtual landmark or to add at least one new virtual landmark based on the determination. In this configuration the example device may be further configured, wherein navigating within the space based on the map comprises the processing module being further to update particle weights for the virtual landmarks based on the measured signatures for the virtual landmarks compared to the signatures recorded in the permanent or provisional maps. In this configuration the example device may be further configured, wherein the processing module is further to determine whether any radio signal sources at a new pose have changed position based on the updated particle weights being substantially similar. In this configuration the example device may be further configured, wherein determining whether any radio signal sources at the new pose have changed position comprises the processing module being further to observe if signal power magnitude changes accumulated over all particles for any radio signal source is substantially higher than signal power magnitude changes accumulated over all particles for other radio signal sources and remove from signatures of the virtual landmarks the signal measurements corresponding to any source of wireless signals whose position was determined to have changed.

In another example there is provided a method. The method may include determining that a device has changed position, estimating the position of the device within a space by determining virtual landmarks associated with regions within a plurality of regions into which the space is virtually divided, updating a map of the space in the device based on the determined virtual landmarks, and navigating within the space based on the map.

The above example method may be further configured, wherein estimating the position of the device comprises determining a new pose for particles corresponding to possible positions of the device within the space in accordance with a Simultaneous Localization and Mapping (SLAM) algorithm including updating virtual landmark estimates based on signal power magnitude and variance measurements of wireless signals received at the new pose, the wireless signal measurements forming a signature by which virtual landmarks are identified. In this configuration the example method may be further configured, wherein updating the map comprises generating a provisional map based on the virtual landmarks, determining whether the virtual landmarks were previously visited, and updating a permanent map to update the signature for at least one existing virtual landmark or to add at least one new virtual landmark based on the determination. In this configuration the example method may be further configured, wherein navigating within the space based on the map comprises updating particle weights for the virtual landmarks based on the measured signatures for the virtual landmarks compared to the signatures recorded in the permanent or provisional maps. In this configuration the example method may further comprise determining whether any radio signal sources at the new pose have changed position based on the updated particle weights being substantially similar, the determination including observing if signal power magnitude changes accumulated over all particles for any radio signal source is substantially higher than signal power magnitude changes accumulated over all particles for other radio signal sources and removing from the signatures of the virtual landmarks the signal measurements corresponding to any source of wireless signals whose position was determined to have changed.

In another example there is provided a system comprising at least a device, the system being arranged to perform any of the above example methods.

In another example there is provided a chipset arranged to perform any of the above example methods.

In another example there is provided at least one machine readable medium comprising a plurality of instructions that, in response to be being executed on a computing device, cause the computing device to carry out any of the above example methods.

In another example there is provided a device. The device may include a communication module to at least receive wireless signals, and a processing module to determine at least one virtual landmark in a space based on the received wireless signals, to generate a map for use in navigating the space based on the at least one virtual landmark, and to navigate within the space based on the generated map.

The above example device may be further configured, wherein the communication module is to receive short-range wireless communication signals from a plurality of radio signal sources within the space. In this configuration the example device may be further configured, wherein the space is virtually divided into a plurality of regions, each of the plurality of the regions being associated with a virtual landmark. In this configuration the example device may be further configured, wherein each virtual landmark associated with a region in the space is identified by a signature comprising measurements of signal power magnitude and variance in the wireless signals received from each of the plurality of signal sources within the space. In this configuration the example device may be further configured, wherein the measured power magnitude and variance of the wireless signals is based on Received Signal Strength Indication (RSSI).

The above example device may be further configured, alone or in combination with the above further configurations, wherein the processing module is to generate the map and navigate using a Simultaneous Localization and Mapping (SLAM) algorithm. In this configuration the example device may be further configured, wherein the SLAM algorithm uses detection of virtual landmarks to correct device pose estimations. In this configuration the example device may be further configured, wherein generating the map comprises the processing module being to generate a provisional map based on the virtual landmarks, to determine whether the virtual landmarks were previously visited, and to update a permanent map to update the signature for at least one existing virtual landmark or to add at least one new virtual landmark based on the determination. In this configuration the example device may be further configured, wherein navigating within the space based on the map comprises the processing module being further to update particle weights for the virtual landmarks based on the measured signatures for the virtual landmarks compared to the signatures recorded in the permanent or provisional maps. In this configuration the example device may be further configured, wherein the processing module is further to determine whether any radio signal sources at a new pose have changed position based on the updated particle weights being substantially similar. In this configuration the example device may be further configured, wherein determining whether any radio signal sources at the new pose have changed position comprises the processing module being further to observe if signal power magnitude changes accumulated over all particles for any radio signal source is substantially higher than signal power magnitude changes accumulated over all particles for other radio signal sources. In this configuration the example device may be further configured, wherein the processing module is further to remove from signatures of the virtual landmarks the signal measurements corresponding to any source of wireless signals whose position was determined to have changed.

In another example there is provided a method. The method may include determining that a device has changed position, estimating the position of the device within a space by determining virtual landmarks associated with regions within a plurality of regions into which the space is virtually divided, updating a map of the space in the device based on the determined virtual landmarks, and navigating within the space based on the map.

The above example method may be further configured, wherein determining the device has changed position comprises sensing a position change in the device based on inertial sensors within the device.

The above example method may be further configured, alone or in combination with the above example configurations, wherein estimating the position of the device comprises determining a new pose for particles corresponding to possible positions of the device within the space in accordance with a Simultaneous Localization and Mapping (SLAM) algorithm. In this configuration the example method may further comprise updating virtual landmark estimates based on signal power magnitude and variance measurements of wireless signals received at the new pose, the wireless signal measurements forming a signature by which virtual landmarks are identified. In this configuration the example method may be further configured, wherein updating the map comprises generating a provisional map based on the virtual landmarks, determining whether the virtual landmarks were previously visited, and updating a permanent map to update the signature for at least one existing virtual landmark or to add at least one new virtual landmark based on the determination. In this configuration the example method may be further configured, wherein navigating within the space based on the map comprises updating particle weights for the virtual landmarks based on the measured signatures for the virtual landmarks compared to the signatures recorded in the permanent or provisional maps. In this configuration the example method may further comprise determining whether any radio signal sources at the new pose have changed position based on the updated particle weights being substantially similar. In this configuration the example method may be further configured, wherein determining whether any radio signal sources at the new pose have changed position comprises observing if signal power magnitude changes accumulated over all particles for any radio signal source is substantially higher than signal power magnitude changes accumulated over all particles for other radio signal sources. In this configuration the example method may further comprise removing from the signatures of the virtual landmarks the signal measurements corresponding to any source of wireless signals whose position was determined to have changed.

In another embodiment there is provided a system. The system may include means for determining that a device has changed position, means for estimating the position of the device within a space by determining virtual landmarks associated with regions within a plurality of regions into which the space is virtually divided, means for updating a map of the space in the device based on the determined virtual landmarks, and means for navigating within the space based on the map.

The above example system may be further configured, wherein determining the device has changed position comprises sensing a position change in the device based on inertial sensors within the device.

The above example system may be further configured, alone or in combination with the above further configurations, wherein estimating the position of the device comprises determining a new pose for particles corresponding to possible positions of the device within the space in accordance with a Simultaneous Localization and Mapping (SLAM) algorithm. In this configuration the example system may further comprise means for updating virtual landmark estimates based on signal power magnitude and variance measurements of wireless signals received at the new pose, the wireless signal measurements forming a signature by which virtual landmarks are identified. In this configuration the example system may be further configured, wherein updating the map comprises generating a provisional map based on the virtual landmarks, determining whether the virtual landmarks were previously visited, and updating a permanent map to update the signature for at least one existing virtual landmark or to add at least one new virtual landmark based on the determination. In this configuration, the example system may be further configured, wherein navigating within the space based on the map comprises updating particle weights for the virtual landmarks based on the measured signatures for the virtual landmarks compared to the signatures recorded in the permanent or provisional maps. In this configuration, the example system may further comprise means for determining whether any sources of the wireless signals received at the new pose have changed position based on the updated particle weights being substantially equal. In this configuration the example system may be further configured, wherein determining whether any radio signal sources at the new pose have changed position comprises observing if signal power magnitude changes accumulated over all particles for any radio signal source is substantially higher than signal power magnitude changes accumulated over all particles for other radio signal sources. In this configuration, the example system may further comprise means for removing from the signatures of the virtual landmarks the signal measurements corresponding to any source of wireless signals whose position was determined to have changed.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A method for determining a location of a mobile device, comprising, with the mobile device:
    receiving one or more wireless signals from at least one signal source in a space virtually divided into a plurality of regions;
    determining that a device has changed position within the space;
    estimating the position of the device within the space, said estimating comprising:
        determining a new pose for each particle by updating an internal measurement unit (IMU) of said mobile device to account for error; and
        updating observed virtual landmark estimates based on signal measurement at a new pose in relevance to one particular landmark;
    updating a map of the space, said updating comprising:
        generating a provisional map based on the observation of said virtual landmark;
            wherein in response to determining that said virtual landmark has been previously visited, updating existing database entries for said virtual landmark with recently observed values; and
            wherein in response to determining that said virtual landmark has not been previously visited, adding new database entries with observed values; and
    navigating within the space based on the map.

2. The method of claim 1, wherein determining the device has changed position comprises sensing a position change in the device based on inertial sensors within the device.

3. The method of claim 1, further comprising updating virtual landmark estimates based on signal power magnitude and variance measurements of the wireless signals received at the new pose.

4. The method of claim 3, wherein updating the map comprises generating a provisional map based on the virtual landmarks, determining whether the virtual landmarks were previously visited, and updating a permanent map to update the signature for at least one existing virtual landmark or to add at least one new virtual landmark based on the determination.

5. The method of claim 4, wherein navigating within the space based on the map comprises updating particle weights for the virtual landmarks based on the measured signatures for the virtual landmarks compared to the signatures recorded in the permanent or provisional maps.

6. The method of claim 5, further comprising determining whether any radio signal sources at the new pose have changed position based on the updated particle weights being substantially similar.

7. The method of claim 6, wherein determining whether any radio signal sources at the new pose have changed position comprises observing if signal power magnitude changes accumulated over all particles for any radio signal source is substantially higher than signal power magnitude changes accumulated over all particles for other radio signal sources.

8. The method of claim 6, further comprising removing from the signatures of the virtual landmarks the signal measurements corresponding to any source of wireless signals whose position was determined to have changed.

9. At least one non-transitory machine-readable storage medium having stored thereon, individually or in combination, instructions that when executed by one or more processors of a mobile device result in the following operations comprising, with the mobile device:
receiving one or more wireless signals from at least one signal source in a space virtually divided into a plurality of regions;
determining that a device has changed position within the space;
estimating the position of the device within the space, said estimating comprising:
determining a new pose for each particle by updating an internal measurement unit (IMU) of said mobile device to account for error; and
updating observed virtual landmark estimates based on signal measurement at a new pose in relevance to one particular landmark;
updating a map of the space, said updating comprising:
generating a provisional map based on the observation of said virtual landmark;
wherein in response to determining that said virtual landmark has been previously visited, updating existing database entries for said virtual landmark with recently observed values; and
wherein in response to determining that said virtual landmark has not been previously visited, adding new database entries with observed values; and
navigating within the space based on the map.

10. The non-transitory medium of claim 9, wherein determining the device has changed position comprises sensing a position change in the device based on inertial sensors within the device.

11. The non-transitory medium of claim 9, further comprising instructions that when executed by one or more processors of the mobile device result in the following operations comprising, with the mobile device:
updating virtual landmark estimates based on signal power magnitude and variance measurements of wireless signals received at the new pose.

12. The non-transitory medium of claim 11, wherein updating the map comprises generating a provisional map based on the virtual landmarks, determining whether the virtual landmarks were previously visited, and updating a permanent map to update the signature for at least one existing virtual landmark or to add at least one new virtual landmark based on the determination.

13. The non-transitory medium of claim 12, wherein navigating within the space based on the map comprises updating particle weights for the virtual landmarks based on the measured signatures for the virtual landmarks compared to the signatures recorded in the permanent or provisional maps.

14. The non-transitory medium of claim 13, further comprising instructions that when executed by one or more processors of the mobile device result in the following operations comprising, with the mobile device:
determining whether any sources of the wireless signals received at the new pose have changed position based on the updated particle weights being substantially equal.

15. The non-transitory medium of claim 14, wherein determining whether any radio signal sources at the new pose have changed position comprises observing if signal power magnitude changes accumulated over all particles for any radio signal source is substantially higher than signal power magnitude changes accumulated over all particles for other radio signal sources.

16. The non-transitory medium of claim 14, further comprising instructions that when executed by one or more processors of the mobile device result in the following operations comprising, with the mobile device:
removing from the signatures of the virtual landmarks the signal measurements corresponding to any source of wireless signals whose position was determined to have changed.

* * * * *